(12) United States Patent
Fyfe

(10) Patent No.: US 9,086,183 B2
(45) Date of Patent: Jul. 21, 2015

(54) EXPANDABLE LINER FOR THE PROTECTION AND STRENGTHENING OF EXISTING PIPES

(71) Applicant: Fyfe Co., LLC, San Diego, CA (US)

(72) Inventor: Edward R. Fyfe, San Diego, CA (US)

(73) Assignee: Fyfe Co. LLC, San Diego, CA (US)

( * ) Notice: Subject to any disclaimer, the term of this patent is extended or adjusted under 35 U.S.C. 154(b) by 0 days.

(21) Appl. No.: 14/054,470

(22) Filed: Oct. 15, 2013

(65) Prior Publication Data

US 2014/0034175 A1    Feb. 6, 2014

Related U.S. Application Data

(63) Continuation of application No. PCT/US2012/034114, filed on Apr. 18, 2012.

(60) Provisional application No. 61/476,484, filed on Apr. 18, 2011.

(51) Int. Cl.
*F16L 55/16* (2006.01)
*F16L 55/165* (2006.01)

(52) U.S. Cl.
CPC ........... *F16L 55/165* (2013.01); *F16L 55/1653* (2013.01)

(58) Field of Classification Search
USPC .................... 138/97, 98; 405/150.1, 184.2
See application file for complete search history.

(56) References Cited

U.S. PATENT DOCUMENTS

| 4,009,063 | A | * | 2/1977 | Wood .............................. 156/71 |
| 4,976,290 | A | | 12/1990 | Gelin et al. |
| 5,049,003 | A | | 9/1991 | Barton |
| 5,077,107 | A | | 12/1991 | Kaneda et al. |
| 5,218,810 | A | | 6/1993 | Isley, Jr. |
| 5,271,433 | A | * | 12/1993 | Schwert et al. ................. 138/98 |
| 5,322,653 | A | | 6/1994 | Muller |
| 5,423,630 | A | * | 6/1995 | Imoto et al. ................ 405/184.2 |
| 5,549,856 | A | * | 8/1996 | Yokoshima ................ 264/36.17 |
| 5,649,398 | A | | 7/1997 | Isley, Jr. et al. |

(Continued)

FOREIGN PATENT DOCUMENTS

EP    2 273 171 A1    1/2011

OTHER PUBLICATIONS

Trenchless Technology, CIPP of Leaking High-Pressure Gas main, Oct. 2011, 4 pages.

(Continued)

*Primary Examiner* — James Hook
(74) *Attorney, Agent, or Firm* — Senniger Powers LLP

(57) ABSTRACT

A method of lining an interior of a pipe in need of repair comprises providing a carrier tube having one or more expandable materials, coating the carrier tube with a binder, securing one or more layers of a fiber-laden material along an exterior surface of the carrier tube with the assistance of the binder. The carrier tube is delivered, together with the at least one layer of the fiber-laden material and the binder, to a targeted location inside a pipe in need of repair. The carrier tube comprises a first diameter while the carrier tube is being delivered to the targeted located inside the pipe in need of repair. The method additionally comprises radially expanding the carrier tube from the first diameter to a second diameter, such that the one or more layers of the fiber-laden material and the binder at least partially contact and/or adhere to an interior wall of the pipe.

16 Claims, 4 Drawing Sheets

(56) References Cited

U.S. PATENT DOCUMENTS

| | | | |
|---|---|---|---|
| 5,683,530 | A | 11/1997 | Fawley et al. |
| 5,931,198 | A | 8/1999 | Raji et al. |
| 5,971,030 | A | 10/1999 | Maimets |
| 6,019,136 | A | 2/2000 | Walsh et al. |
| 7,261,788 | B1 * | 8/2007 | Driver .......................... 156/203 |
| 7,478,650 | B2 * | 1/2009 | Pleydon et al. ................ 138/98 |
| 2002/0124898 | A1 | 9/2002 | Renaud et al. |
| 2003/0066567 | A1 | 4/2003 | Manners |
| 2003/0113489 | A1 | 6/2003 | Smith |
| 2003/0138298 | A1 | 7/2003 | Mercier |
| 2004/0149341 | A1 * | 8/2004 | Driver .......................... 138/98 |
| 2004/0258479 | A1 | 12/2004 | Manners |
| 2005/0028880 | A1 | 2/2005 | Smith |
| 2007/0074774 | A1 | 4/2007 | Chandler |
| 2007/0267785 | A1 | 11/2007 | Bellamy et al. |
| 2009/0116927 | A1 | 5/2009 | Keenan et al. |
| 2009/0314409 | A1 | 12/2009 | Ehsani |
| 2010/0078118 | A1 | 4/2010 | Ehsani |
| 2010/0212803 | A1 | 8/2010 | Carr et al. |

OTHER PUBLICATIONS

International Search Report in related application PCT/US2012/34114 dated Jul. 17, 2012, 4 pa.

Written Opinion in related application PCT/US2012/34114 dated Jul. 17, 2012, 4 pages.

Trenchless Technology, Trenchless Lateral Repair Keeps Oregon Landscape Untouched, Apr. 2012, 2 pages.

Extended European Search Report for Application No. 12774573.5, 7 pages, dated Aug. 27, 2014.

Vectorply(R) Performance Composite Reinforcements, product sheet E-LTM 3610, Vectorply(R) Corporation, Rev. May 3, 2011.

Vectorply(R) Performance Composite Reinforcements, product sheet E-BX 1200, Vectorply(R) Corporation, Rev. May 3, 2011.

Vectorply(R) Performance Composite Reinforcements, product sheet E-TLX 2400, Vectorsports(TM), Vectorply(R) Corporation, Rev. May 3, 2011.

Vectorply(R) Performance Composite Reinforcements, product sheet E-QX 4800, Laborsaver(TM), Vectorply(R) Corporation, Rev. May 3, 2011.

Vectorply(R) Performance Composite Reinforcements, product sheet E-LM 3610, Laborsaver(TM), Vectorply(R) Corporation, Rev. May 3, 2011.

Vectorply(R) Performance Composite Reinforcements, product sheet E-TLX 2200, Vectorsports(TM), Vectorply(R) Corporation, Rev. May 3, 2011.

Vectorply(R) Performance Composite Reinforcements, product sheet E-BXM 1708, Vectorply(R) Corporation, Rev. May 3, 2011.

Vectorply(R) Performance Composite Reinforcements, product sheet E-BX 1700, Vectorply(R) Corporation, Rev. May 3, 2011.

Vectorply(R) Performance Composite Reinforcements, product sheet E-QXCFM 3510, Vectorfusion(TM) Infusion Specific Reinforcements, Vectorply(R) Corporation, Rev. May 3, 2011.

Vectorply(R) Performance Composite Reinforcements, product sheet E-BXCFM 1710, Vectorfusion(TM), Infusion-Specific Reinforcements, Vectorply(R) Corporation, Rev. May 3, 2011.

Rongxing Zhou, An Improved MWK Structure for Composite Reinforcement, Textile Research Journal, Published by Sage, Apr. 1, 2005.

Fyfe(R) an Aegion Company, Tyfo(R) Fibrwrap(R) Composite Systems, 3 pages, Copyright 2013 Fyfe Co., LLC (admitted prior art).

* cited by examiner

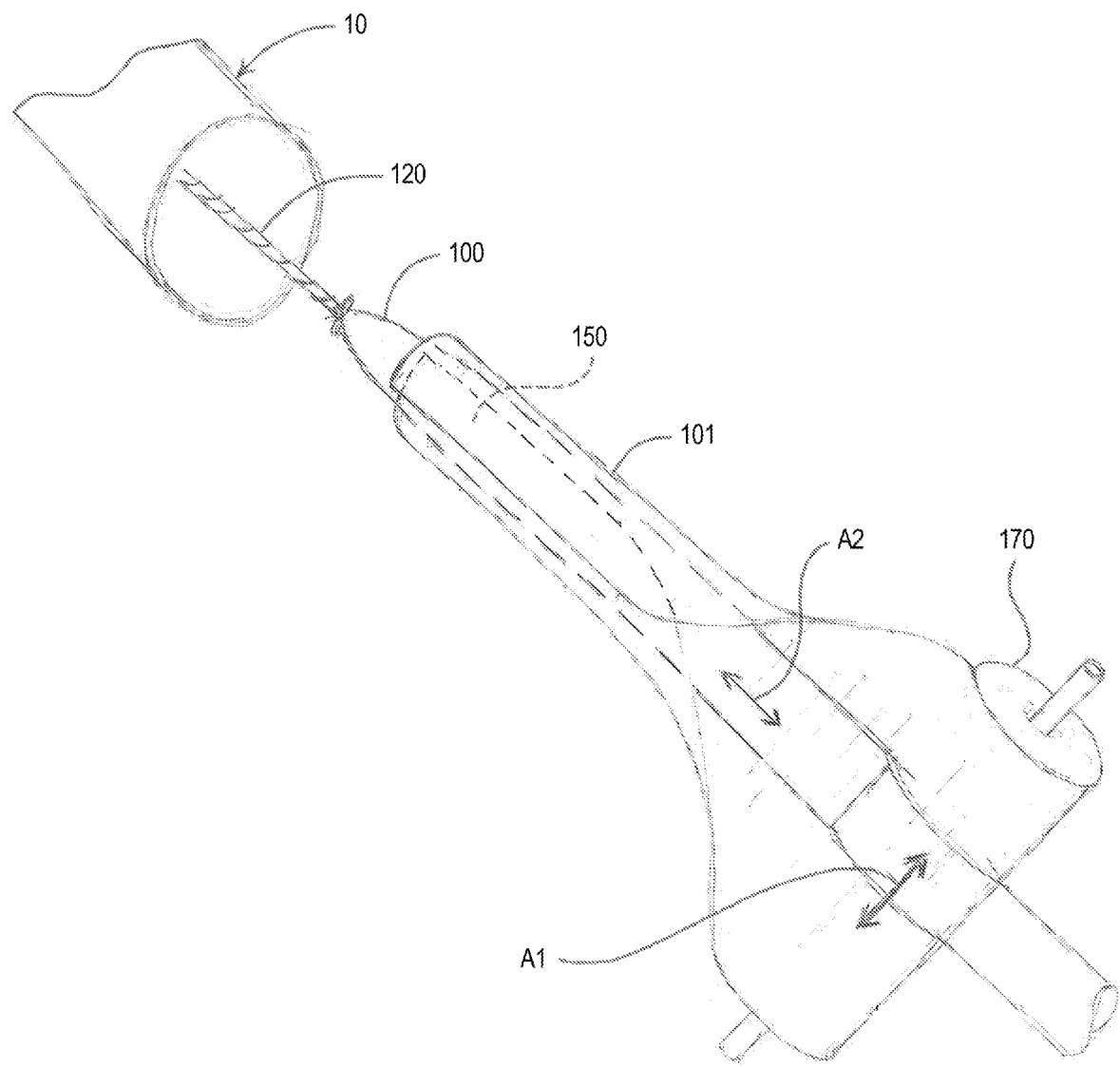

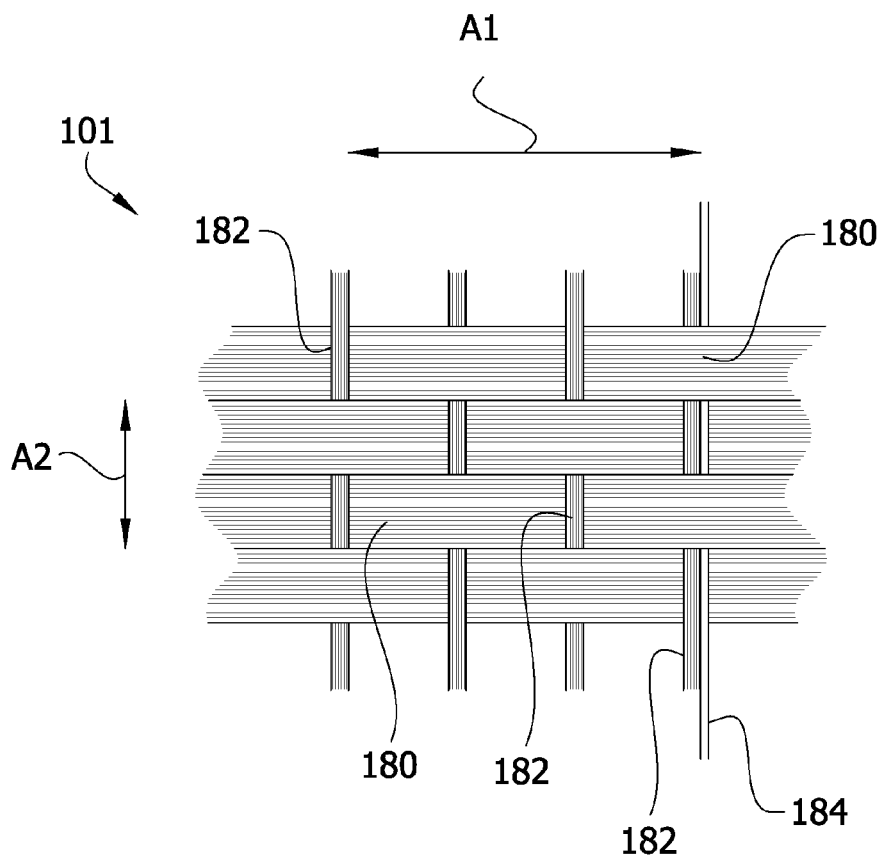

EXPANDABLE LINER FOR THE PROTECTION AND STRENGTHENING OF EXISTING PIPES

CROSS-REFERENCE TO RELATED APPLICATIONS

This application is a continuation of PCT Patent Application No. PCT/US2012/034114, filed Apr. 18, 2012, which claims priority to U.S. Provisional Patent Application No. 61/476,484, filed Apr. 18, 2011, each of which is hereby incorporated by reference in their entirety.

BACKGROUND

1. Field

This application relates generally to devices, systems and methods for reinforcing and/or strengthening pipes and other structures, and more specifically, to devices, systems and methods for reinforcing and/or strengthening the interior of pipes with resin-coated fiber materials using an expandable tube.

2. Description of Related Art

Over time or because of a particular event or condition (e.g., seismic activity, exposure to excessive or uneven loads or moments, poor compaction, crown corrosion, corrosive soil, etc.), the structural integrity or capacity of force mains, other pipes and other structures may diminish. For example, such items may crack, corrode, deteriorate and the like. Different methods of repairing or otherwise strengthening damaged pipes and other items are well-known. For example, liners or sheets can be attached to one or more portions of a pipe interior. Typically, such liners or sheets must be pre-manufactured and transported to a job site. In addition, these liners and sheets are often hand applied, making their installation labor consuming and expensive. Thus, there remains a need for a more efficient and cost-effective method of reinforcing pipes and other structures using fiber materials, such as, carbon fiber reinforced polymer.

SUMMARY

According to some embodiments, a method of lining an interior of a pipe in need of repair (e.g., in order to reinforce and/or strengthen the pipe) comprises providing a carrier tube having one or more expandable materials (e.g., polyethylene, other polymeric materials, other polymeric materials, etc.), coating the carrier tube with a binder (e.g., resin, epoxy, thermosetting binder or other material, etc.), securing one or more layers of a fiber-laden material (e.g., carbon fiber fabric, other type of fiber fabric, splayed fiber roving or bundles, etc.) along an exterior surface of the carrier tube with the assistance of the binder. The method further comprises delivering the carrier tube, together with the at least one layer of the fiber-laden material and the binder, to a targeted location inside a pipe in need of repair. In one embodiment, the carrier tube comprises a first diameter while the carrier tube is being delivered to the targeted location inside the pipe in need of repair.

The method additionally comprises radially expanding the carrier tube from the first diameter to a second diameter, such that the one or more layers of the fiber-laden material and the binder at least partially contact and/or adhere to an interior wall of the pipe in need of repair when the carrier tube is radially expanded to the second diameter, wherein the second diameter is greater than the first diameter. The method further includes curing the binder so that a combination of the fiber-laden material and the cured binder remains immediately adjacent to the interior wall of the pipe in need of repair.

According to some embodiments, the method additionally comprises curing the carrier tube simultaneously with curing the binder, wherein the cured carrier tube comprises the second diameter and remains within the interior of the pipe in need of repair immediately adjacent the combination of the at least one layer of fiber-laden material and the cured binder. In some embodiments, the carrier tube comprises polyethylene and/or one or more other polymeric materials. In one embodiment, the carrier tube comprises one or more flexible materials. In some embodiments, the binder comprises a polymeric resin. In some embodiments, the binder comprises a thermosetting material. In certain embodiments, the layer of a fiber-laden material comprises a carbon, aramid or other type fiber fabric.

According to some embodiments, securing one or more layer of a fiber-laden material to the outside of carrier tube comprises positioning at least one layer of fiber-laden fabric on the binder coated on the exterior surface of the carrier tube. In one embodiment, the one or more layers of fiber-laden fabric overlaps itself in the circumferential or hoop direction. In some embodiments, securing at least one layer of a fiber-laden material to the carrier tube comprises positioning two or more layers of fiber-laden fabric along the exterior surface of the carrier tube. In one embodiment, a first layer of fiber-laden fabric overlaps an adjacent second layer of fiber-laden fabric in the longitudinal direction. In some embodiments, one or more layers of fiber-laden fabric overlaps itself both in the hoop and longitudinal directions.

According to some embodiments, coating the carrier tube with the binder precedes securing the at least one layer of the fiber-laden material along the exterior surface of the carrier tube. In other embodiments, coating the carrier tube with the binder occurs generally simultaneously or nearly simultaneously with securing the at least one layer of the fiber-laden material along the exterior surface of the carrier tube. In some embodiments, delivering the carrier tube to a targeted location inside a pipe in need of repair comprises attaching a pull rope and/or other device or system to the carrier tube and pulling the pull rope and/or other device of system at least partially through an interior of the pipe in need of repair. In one embodiment, delivering the carrier tube to a targeted location inside a pipe in need of repair comprises moving the carrier tube through at least one manhole accessway or other passage.

According to some embodiments, radially expanding the carrier tube from the first diameter to the second diameter comprises pressurizing an interior of the carrier tube by delivering a volume of air or other fluid therein. In some embodiments, radially expanding the carrier tube occurs within approximately 30, 60, 90, 120, 150, 180 minutes or longer of coating the carrier tube with the binder. In some embodiments, curing the binder comprises allowing for the passage of a curing time period (e.g., approximately 30 minutes to 3 hours, less than 30 minutes, more than 3 hours, etc.). In some embodiments, curing the binder comprises passing generally ambient air along or near the binder.

According to some embodiments, passing generally ambient air along or near the binder is accomplished using a blower, fan or other fluid transfer device. In some embodiments, curing the binder does not include thermally conditioning the binder. In some embodiments, curing the binder comprises thermally conditioning the binder. In one embodiment, thermally conditioning the binder comprises heating the binder to a temperature above 100° F. and/or cooling the binder (e.g., to a temperature below an initial binder temperature or below ambient temperature). In some embodiments, thermally conditioning the binder comprises heating the binder to a temperature between about 100 and 350° F.

According to some embodiments, the pipe or other conduit in need of repair comprises a diameter of approximately between 4 inches and 144 inches. In one embodiment, the carrier tube remains within the pipe in need of repair after radially expanding the carrier tube from the first diameter to the second diameter. In another embodiment, the carrier tube is separated from the adjacent combination of the at least one layer of the fiber-laden material and the cured binder after curing the binder, allowing the carrier tube to be removed from the pipe in need of repair.

According to some embodiments, lining an interior of a pipe in need of repair comprises structurally reinforcing the pipe. In some embodiments, lining an interior of a pipe in need of repair comprises improving an interior wall surface of the pipe. In one embodiment, delivering the carrier tube within the pipe to be repaired occurs without first coating or otherwise preparing the interior wall of the pipe. In another embodiment, the method additionally comprises cleaning the interior of the pipe to be repaired prior to delivering the carrier tube, the at least one layer of the fiber-laden material and the binder therein.

BRIEF DESCRIPTION OF THE DRAWINGS

These and other features, aspects and advantages of the present inventions are described with reference to drawings of certain embodiments, which are intended to illustrate, but not to limit, the present inventions. The drawings include four (4) figures. It is to be understood that the attached drawings are for the purpose of illustrating concepts of the present inventions and may or may not be to scale.

FIG. 5 illustrates a perspective of a reinforcement material being applied from a roll onto an expandable tube before being inserted into a pipe in need of repair; and FIG. 6 illustrates a portion of an example reinforcement material.

DETAILED DESCRIPTION

Figure 1:
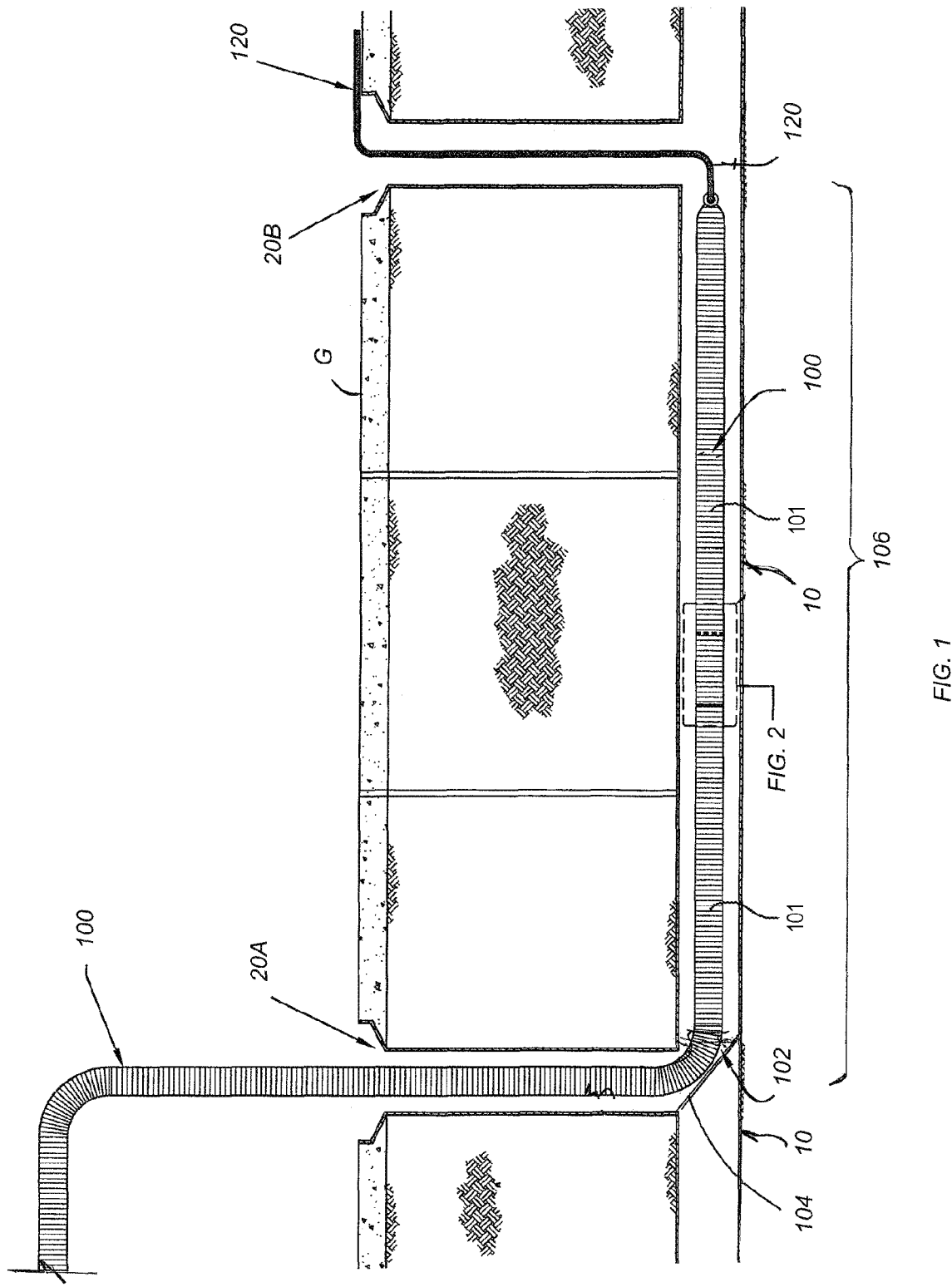
FIG. 1 illustrates a side cross-sectional view of one embodiment of an expandable tube positioned within an existing underground pipe or conduit.

FIG. 1 illustrates a side cross-sectional view of a pipe 10 or other conduit. The pipe or conduit can be situated below ground G, as depicted in FIG. 1, or above ground, as desired or required by the specific application or use. Such a pipe or conduit, which may or may not be pressurized, can be used to transfer liquids, other fluids, solids and/or other items or materials to a desired location. Alternatively, the pipe or other conduit 10 can be used as a passage for cable and/or other goods or items. Further, the pipe or conduit 10 can comprise any size, shape (e.g., circular, oval, square or other rectangular, other polygonal, irregular, etc.), material (e.g., concrete, steel or other metal or alloy, clay, PVC or polymeric material, etc.) and/or the like. In some embodiments, the devices, systems and method disclosed herein are configured to line the interior wall of pipes or conduits having a diameter of approximately 10 to 366 cm (e.g., 10, 15, 20, 25, 30, 35, 41, 46, 61, 91, 122, 152, 183, 244, 274, 305, 366 cm, diameters between the foregoing values, etc.) (4 to 144 inches (e.g., 4, 6, 8, 10, 12, 14, 16, 18, 24, 36, 48, 60, 72, 96, 108, 120, 144 inches, diameter between the foregoing values, etc.)). In other embodiments, however, such devices, systems and methods can be used to reinforce pipes or conduits smaller than about 4 inches in diameter or larger than about 144 inches in diameter. Regardless of their size, shape, orientation, location and/or other details, such pipes or other conduits may need general repair or reinforcement (e.g., due to age, surrounding conditions, the occurrence of certain events, etc.). Accordingly, the various devices, systems and methods disclosed herein can assist in repairing, reinforcing and/or otherwise improving the condition of pipes and similar structures.

By way of example, certain portions of the pipe interior can be corroded, deteriorated, broken, cracked or otherwise compromised. Thus, it may be advantageous to provide one or more protective layers along the inside of the damaged pipe or conduit 10. This can help prevent or reduce the likelihood of undesirable leaks (e.g., liquids, solids, other materials, etc.), pressure loss (e.g., for pressurized lines) and/or the like. In addition, such repairs can help prevent or reduce the likelihood of additional damage occurring to the pipe or conduit 10. Further, the lining of existing pipes or other conduits in need of repair can provide the structural integrity required to continue operating such pipes or conduits. Thus, the life of the existing pipe or conduit 10 can be advantageously extended and its performance can be improved.

With continued reference to FIG. 1, an expandable tube or carrier tube 100, pipe or other member can be strategically positioned within and routed through a section of a pipe 10 to be lined or otherwise repaired. According to some embodiments, the tube 100 includes one or more base or carrier layers that comprise polyethylene, other polymeric materials and/or other expandable materials. In yet other arrangements, the carrier layers and/or other portions of the expandable tube 100 can include one or more other materials, either in lieu of or in addition to polyethylene or other plastics or expandable materials. In other words, one or more additives can be included within the tube 100 (e.g., to improve the flexibility, durability, longevity, resistance to pH, chemicals, other materials and/or the like), as desired or required.

The tube 100 can comprise one, two or more layers of polyethylene and/or any other material, as desired or required. As discussed in greater detail herein, the carrier tube 100 can comprise a main or base portion on which additional layers can be applied or otherwise deposited (e.g., along the exterior of such carrier tube). The thickness of the one or more layers that comprise the carrier tube and/or the one or more layers that are deposited along an exterior of the carrier tube can vary, depending on the particular application or use. For example, the type, number of layers, thickness and/or other properties of the expandable tube 100 and/or the resin-impregnated fiber-laden layers positioned thereon can be advantageously selected depending on the characteristics (e.g., size, shape, condition, etc.) of the existing pipe or other conduit into which the tube 100 will be positioned, the level of protection desired and/or the like. The terms "expandable tube" and "carrier tube" are used interchangeably herein.

According to some embodiments, the expandable tube serves as a carrier or base for one or more reinforcement layers and/or other materials 101. In some arrangements, the reinforcement 101 that is deposited or otherwise positioned on the carrier tube 100 comprises fibers (e.g., in the form of fabric layers, splayed roving or bundles, etc.) saturated, impregnated and/or otherwise coated with resin, epoxy, thermosetting polymer or other thermosetting binder, thermoplastic binder, and/or any other type of binder materials. For any of the embodiments disclosed herein, the level of saturation of the fiber-based materials by the thermosetting resin or other binding materials can vary, as desired or required. For example, the fiber-based fabric, splayed roving and/or other material 101 can be fully saturated with a resin or other binder. In other embodiments, a relatively small amount of resin or other binder material is added (e.g., coated) on the fiber-based fabric or other reinforcement layer 101.

The reinforcement material 101 can include carbon, glass, aramid and/or other types of fibers, as desired or required. Such reinforcement 101 can be provided in one or more forms, such as, for example, fiber fabric, sheet, mat and/or other layers, fiber roving or bundles that are subsequently splayed or spread, and/or the like. As discussed in greater detail herein, once the resin-rich fibers have been disposed along the outside the expandable or carrier tube 100 and the tube has been properly positioned within a pipe or other conduit 10, the tube can be expanded so that the fiber-based reinforcement layer(s) 101 contact and selectively adhere to the interior of the pipe or conduit. As a result, the resin-coated fibers can help reinforce, repair and/or otherwise enhance one or more structural, functional and/or other characteristics of an existing pipe or other conduit.

As noted above, the expandable tube 100 can serve as a carrier for one or more reinforcement layers and/or materials 101. For example, the tube 100 can be wrapped with one or more layers of carbon fiber reinforced polymer (CFRP), glass fiber reinforced polymer (GFRP), aramid reinforcing fibers, other reinforcing polymers or materials and/or the like. In one embodiment, the reinforcement 101 comprises carbon-based fabric, glass cross fibers and an epoxy matrix, such as, for example, the Tyfo® SCH-41 Composite by Fyfe Co., LLC (San Diego, Calif.). In other embodiments, the tube 100 can be at least partially wrapped or otherwise reinforced using splayed resin-coated carbon bundles, such as, for example, the embodiments disclosed in U.S. patent Ser. No. 12/709, 388, filed on Feb. 19, 2010 and published as U.S. Publication No. 2010/0212803, the entirety of which is hereby incorporated by reference herein.

Fibers and/or other reinforcement members 101 can be situated in one or more directions relative to the expandable tube 100. For example, according to some embodiments, fibers (e.g., carbon, aramid, glass, etc.) of a reinforcement member (e.g., fabric, layers, splayed bundles, etc.) overlap in both the hoop and longitudinal directions of the expandable tube 100. Alternatively, fibers can be placed only in the hoop direction or only in the longitudinal direction, as desired or required. In other arrangements, fibers can be oriented in one or more other directions (e.g., diagonal, skewed relative to both the hoop and longitudinal directions, etc.) either in lieu of or in addition to the hoop and/or longitudinal directions.

According to some embodiments, the expandable tube 100 is routed through a resin saturator machine (not shown) in order to deposit the desired resin or other binder along the outside of the tube. Such an initial saturation or other depositing of resin, other polymeric thermosetting material and/or other binder can facilitate the subsequent placement of fiber-laden fabrics and/or other reinforcement members 101 along the outside of the tube 100. Further, placement of the saturation machine in the field can help ensure that the resin (or other thermosetting material or binder), the expandable or carrier tube and/or other portions of the reinforcement system are within a target temperature when delivered and positioned within a larger pipe 10. For example, the resin applied to the expandable or carrier tube 100 by the saturation machine can be at an elevated temperature (e.g., relative to ambient) to ensure that any reinforcement materials 101 subsequently applied to the outside of the tube 100 (e.g., fiber-laden fabrics, splayed fiber bundles, etc.) properly adhere to the tube 100. Further, an elevated temperature of the expandable tube 100 can facilitate the later expansion of the tube 100 (e.g., once properly positioned within the pipe 10), can help create a stronger bond or interface between the expanded tube 100 and the interior surface of the pipe 10 and/or can help provide one or more other benefits.

With continued reference to FIG. 1, regardless of its exact configuration and other properties, the carrier tube 100 can be routed through a section of existing pipe 10 that requires reinforcement or is otherwise in need of repair. For example, in the illustrated arrangement, the expandable tube 100 is passed through a section of underground pipe 10 that is located between two adjacent manholes 20A, 20B or other access openings. In other arrangements, however, the expandable tube 100 is passed along a longer or shorter section of a pipe or other conduit, as desired or required. In addition, depending on the specific application, alternative access can be provided to the interior of the pipe or other conduit 10. For example, the carrier tube 100 and the resin-impregnated fiber fabric or other material 101 deposited thereon can be passed through another type of access point, an open end of a pipe (e.g., along a portion of the pipe that is at or near ground level G or otherwise accessible) and/or the like.

With continued reference to FIG. 1, a pull rope 120 or other feature or device can be used to move the expandable tube 100 through a desired section of pipe or other conduit 10. The pull rope 120 can be removably or permanently attached to an end of the tube 100. For example, as illustrated in FIG. 1, the rope 120 can be secured to the tube's leading end. Alternatively, the pull rope 120 and/or any other positioning feature can be secured to one or more other portions of the expandable tube 100 (e.g., the trailing end, an intermediate portion, etc.), as desired or required.

According to some embodiments, the pipe or other conduit 10 in need of repair is initially cleaned and/or otherwise treated prior to passing the expandable tube 100 through its interior. A trenchless cleaner and/or any other cleaning device, system, solution, other material and/or method can be used to help clean the interior of the pipe 10 that will be lined. For example, the pipe or other conduit 10 can be cleaned using a pipeline pig, a surge of high pressure fluid through the targeted pipe section, one or more cleaning fluids and/or other materials and/or the like. In some embodiments, no coating or other layers are required to be placed along the interior wall of the pipe or conduit in need of repair before delivering the expandable tube 100 therethrough. Thus, the labor, cost, time and/or disadvantages associated with such initial preparatory work can be advantageously reduced or eliminated.

Once the pipe interior has been adequately cleaned and/or otherwise prepared, the fiber-reinforced expandable tube 100 can be delivered into the targeted section of existing pipe. In some embodiments, as illustrated in FIG. 1, the tube 100 is routed through a first manhole 20A, through the section 106 of pipe to be lined and out of a second manhole 20B. As noted above, movement of the expandable tube 100 through the manholes 20A, 20B (or other accessways), pipe 10 and/or other passages can be facilitated by a pull rope 120 and/or other device.

According to some embodiments, the expandable tube 100 is delivered to the targeted section of pipe or other conduit 10 immediately after the tube has been saturated or otherwise coated with resin, epoxy and/or other thermosetting polymer (e.g., using an automatic or manual saturation device or system) and covered with one or more layers of fiber 101 (e.g., fiber-laden fabric or sheets, splayed fiber bundles or roving, etc.). Thus, in such embodiments, the temperature of the expandable tube (e.g., at least in part because it has been passed through or near a resin saturation device or system) is generally elevated. For example, the temperature of the fiber-covered expandable tube 100 can be approximately 4 to 49° C. (e.g., about 16 to 21° C., about 10 to 27° C., etc.) (40 to 120° F. (e.g., about 60 to 70° F., about 50 to 80° F., etc.)). According to some embodiments, the ambient temperature can affect the temperature of the tube 100. For example, in desert environments or other relatively hot climates, the tube 100 can reach temperatures of up to or exceeding about 120° F., especially if the pipe in need or repair is not buried or otherwise exposed to sunlight or ambient heat.

Using a heated expandable tube 100 can provide one or more benefits or other advantages to the reinforcement system and related method. For instance, at such temperatures, the one or more portions that comprise the expandable or carrier tube 100 can be softer and more pliable, thereby facilitating the subsequent expansion of the tube once it has been properly positioned within a pipe. Relatedly, under such circumstances, adhesion between the expandable pipe and adjacent resin-impregnated fiber layers 101 and/or interior surfaces of the pipe 10 can be facilitated and otherwise enhanced.

In some embodiments, the expandable tube 100 is at least partially filled with fluid (e.g., air, other gases, etc.) during its delivery within a targeted portion of the existing pipe or conduit 10. For example, the approximately 40-60% (e.g., about 40%, 45%, 50%, 55%, 60%, percentages between the foregoing values, etc.) of the interior of the expandable tube 100 can be filled with air. In other arrangements, more than about 60% (e.g., approximately 65%, 70%, 75%, 80%, more than about 80%, percentages between the foregoing values, etc.) or less than about 40% (e.g., approximately 35%, 30%, 25%, 20%, more than about 20%, percentages between the foregoing values, etc.) of the expandable tube 100 is filled with air and/or other fluid, as desired or required. Fluids can be delivered within the tube interior using one or more blowers, fans and/or other fluid transfer devices. In some embodiments, the rate of delivery of fluids from such blowers or other devices is selectively adjustable by the user (e.g., in order to control the rate of radial expansion of the tube).

According to some embodiments, the air or other fluid delivered into the interior of the expandable tube 100 during and/or after delivery to the desired location within the pipe 10 is thermally and/or environmentally controlled. For example, in order to maintain a desired level of flexibility, expandability, softness and/or the like, the air can be heated and/or cooled, as desired or required. In some embodiments, the relative humidity of such fluids can be monitored and controlled. Conditioning of the air and/or other fluids delivered into the expandable tube 100 can be performed using one or more heating and/or cooling devices (e.g., conductive or convective heaters, chillers, thermoelectric devices, etc.), dehumidifying devices, one or more sensors (e.g., temperature, humidity, condensation, etc.), control units and/or the like. According to some arrangements, heating and/or cooling of such air is regulated in a manner that prevents or reduces the likelihood of condensation being formed on, within or near the expandable tube.

Once the expandable tube 100 has been properly positioned within the interior of the existing pipe or other conduit 10, the tube can be radially expanded by delivering additional air and/or other gas within its interior (e.g., using a blower, fan, other fluid transfer device, etc.). Alternatively, a vacuum or negative pressure can be created within the pipe 10 to help urge the expandable pipe toward the interior walls of the pipe, either in lieu of or in addition to delivering air within an interior of the pipe 10. For example, one or more vacuum sources can be placed in fluid communication with the interior of the pipe 10 being repaired (e.g., via suction lines or other conduits). Such suction conduits can be configured to penetrate the walls of the pipe 10 or other conduits. Alternatively, suction conduits can be positioned within the pipe without penetrating the pipe wall, as desired or required. Thus, the interior of the pipe 10 can be selectively placed in fluid communication with a suction device or other vacuum source, allowing air or other fluids to be removed from within the interior of the pipe 10. As a result, a vacuum or negative pressure can be selectively generated within the pipe interior, facilitating the outward radial expansion of the tube 100.

According to some embodiments, the tube 100 can be radially expanded so that it completely or substantially completely contacts an entire interior wall of the pipe or other conduit 10. For example, through the delivery of fluids within an interior of the expandable tube 100 and/or through the creation of a vacuum along the outside of the tube, the tube can expand to the orientation illustrated in FIG. 4. As noted above, the effective diameter (or level of expansion) of the tube 100 during delivery and positioning within an existing pipe or conduit 10 can be smaller or greater than depicted in FIG. 3, as desired or required.

In some embodiments, the expandable tube 100 needs to be expanded within a particular time period after being saturated or otherwise coated with resin and/or fabric 101. For instance, in order to permit the expandable tube 100 to adequately and safely expand (e.g., using the application of pressure along its interior, vacuum or suction along its outside, etc.), expansion of the tube may need to occur while the polyethylene carrier, the resin, the fiber-laden fabric or any other material 101 and/or component of the expandable tube 100 are within a desired temperature range. For example, as noted above, the tube 100 can comprise a temperature that is higher than the ambient temperature after passage through a saturation machine, after being coated with a resin, epoxy or other thermosetting binder and/or the like. Therefore, in some embodiments, the tube 100 needs to be expanded within about one hour after preparation (e.g., saturation or coating) and/or delivery within pipe or other conduit 10. In other embodiments, based in part on the types of materials used, the thickness and/or other dimensions of the tube 100, the thickness and/or dimensions of the resin and/or fiber layers or coatings, the ambient conditions (e.g., temperature, relative humidity level, etc.) and/or the like, the maximum time period for expansion can be less or more than about one hour (e.g., approximately 30, 40, 70, 80 or 90 minutes, 2 hours, 3 hours, more than 3 hours, less than 30 minutes, values between the foregoing time periods, etc.).

In order to limit or otherwise control expansion of the tube 100, one or more barriers 104 or other devices can be used. These barriers or other devices can help ensure that the tube 100 does not undesirably expand along certain areas or directions, such as, for example, within manhole accessways or other passages, along or near the interface between the accessways and the pipe 10 and/or the like. In the arrangement depicted in FIG. 1, a barrier 104 is positioned along the interface of the manhole accessway and the beginning of the pipe 10 to be repaired. Thus, when the tube 100 is expanded (e.g., via internal pressurization), the barrier 104 can provide the necessary resistive force to help ensure that the tube will not expand in the direction of one or more areas or regions (e.g., rearwardly toward the upstream portion of the pipe 10 that is not intended to be coated, into the interface of the passageway and the pipe, etc.).

In other embodiments, expansion of the tube 100 can be controlled, at least in part, by modifying the location within the tube that air or other fluid is introduced. For example, in one embodiment, the pressurization air is supplied to the interior of the expandable tube 100 downstream of the bend 102 located at or near the interface of the accessway and the pipe 10 to be repaired. Thus, in such arrangements, an interior pressurization air pipe (not shown) can be inserted within the expandable tube 100 and moved to a desired location where air or other fluid will be introduced. Relatedly, one or more internal barriers, such as, for example, inflatable balloons, other blocking members and/or the like, can be selectively used to control the delivery of expansion fluids within the tube 100 (e.g., along which portions of the interior of the pipe or other conduit 10 air will be delivered).

Figure 4:
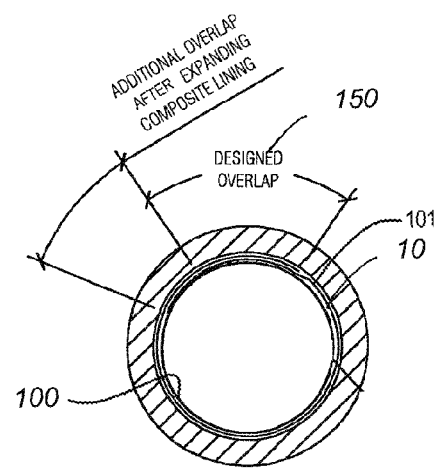

After the tube 100 has been radially expanded, as depicted, for example, in FIG. 4, the resin-coated or resin-impregnated fibers 101 (e.g., fabric, splayed roving or bundles, etc.) can contact the interior wall of the existing pipe or conduit 10. Under certain circumstances, the resin-impregnated fibers 101 can advantageously attach, adhere or otherwise bond to the interior wall of the pipe. Accordingly, one or more layers of fiber reinforcement 101 can be added to the interior surface of the pipe or conduit 10. Such reinforcement can help improve the pipe's structural characteristics, can help repair or rehabilitate deteriorated or damaged portions of the pipe and/or provide one or more additional benefits or advantages. Additionally, in embodiments where the polyethylene or other type of carrier portion of the expandable tube 100 is configured to remain within the pipe 10, the interior surface of the pipe can be improved. For example, the expanded tube 100 can provide the pipe or conduit 10 with a smoother, more continuous and/or more even surface, thereby reducing or minimizing friction losses, leaks and/or the like.

According to some embodiments, one or more portions of the expandable tube, and thus the resin and fibers 101 attached along the outside thereof, are maintained and subsequently delivered within the targeted existing pipe section at a temperature that is higher or lower than ambient. For example, an expandable tube exiting a resin saturation device and an ensuing fiber coating procedure can have a temperature that is approximately 4 to 29° C. (40 to 120° F.). Such a saturation temperature can help ensure that fiber-laden fabrics and/or other reinforcement materials 101 can adequately secure along the outside of the carrier tube. As discussed in greater detail herein, once the tube 100 has been properly positioned within the existing pipe 10, it can be expanded so that it contacts the interior wall of the pipe. In some embodiments, heat is used to cure the expanded tube 100. The curing process can help ensure that the tube 100 and the resin-laden fibers 101 remain attached to the pipe or conduit 10. Alternatively, one or more other methods can be used to cure the expanded tube 100, such as, for example, chemical curing, irradiation, electron beam processing and/or the like.

As a result, the expanded tube 100 can be delivered to the target location within an existing pipe, conduit or other structure while in a generally softened or malleable form. This can advantageously allow for the subsequent expansion of the tube 100 so that it generally conforms and/or adheres to the interior of the pipe being repaired. Thus, the curing process can help ensure that the tube 100 and/or the resin-impregnated fibers 101 attached thereto assume and retain a desired shape within the existing pipe or conduit.

In some embodiments, the curing process does not involve heating and/or cooling of the tube, resin and/or other materials associated with the lining. For example, curing can involve allowing the various polymeric materials exiting the resin-saturation process to cool over time (e.g., with the use of ambient air or other fluids). Thus, in some arrangements, the curing process comprises the passage of time. The amount of time required to properly cure a liner (e.g., the polymeric carrier, the epoxy or other resin used to attach the fiber fabric to the outside of the carrier, etc.) can vary depending on the types of materials used (e.g., the material(s) of the carrier, the type of epoxy or other resin, the type of fiber-laden fabric or other members 101, etc.), the ambient conditions (e.g., ambient temperature, ambient relative humidity, etc.), the thickness of the lining to be applied to the pipe or conduit in need of repair, the saturation temperature of the resin-impregnated fiber fabric or other reinforcement material 101, the temperature of the pipe interior and/or one or more other factors or considerations. According to some embodiments, the curing time is approximately an hour (e.g., about 40, 50, 60, 70, 80 minutes, times between the foregoing values, etc.). In other embodiments, the curing time is less than approximately 1 hour (e.g., about 5, 10, 15, 20, 25, 30, 35, 40, 50 minutes, times between the foregoing values, etc.) or more than approximately 1 hour (e.g., about 60, 65, 70, 75, 80, 85, 90, 100, 110 minutes, 2 hours, 2½, 3, 3½, 4, 5 hours, more than 5 hours, times between the foregoing values, etc.), as desired or required.

However, according to other some embodiments, the curing process comprises elevating the temperature of the expandable tube 100 to above a certain temperature. For example, curing can include heating the expandable tube to a temperature above about 38° C. (e.g., approximately 38, 49, 60, 71, 82, 93, 99, 104, 116 121, 135, 149, 177, 204° C., values between the foregoing temperatures, temperatures below 38° C., temperatures above ° C., etc.) (100° F. (e.g., approximately 100, 120, 140, 160, 180, 200, 210, 220, 230, 240, 250, 275, 300, 350, 400° F., values between the foregoing temperatures, temperatures below 100° F., temperatures above 400° F., etc.)). In one embodiment, for instance, curing involves heating the resin to temperatures up to about 310° F. In other embodiments, the curing process involves heating the expandable tube 100 to temperatures between about 100 and 200° F. The curing process can be configured to target the polyethylene or other carrier portion of the expandable tube and/or the epoxy, resin or other thermosetting polymer used to bind the fiber-laden fabric or other fiber base material 101 to the main, carrier portion of the tube. In alternative embodiments, the resin, epoxy and/or other polymeric binding materials that help secure the fiber fabric and/or fabric members to the expandable tube 100 are cured by lowering the temperature of the tube.

Heating, cooling and/or otherwise thermally conditioning the expandable pipe (e.g., for purposes of curing, maintaining a desired temperature prior to or during installation of the tube within the existing pipe or conduit, etc.) can be accomplished using any one of a number of devices and/or methods. In one embodiment, once expanded, the resin and/or main carrier portion of the tube 100 are cured by introducing heated air or other fluid within and/or along the outside of the tube. Such thermally-conditioned air can be delivered to, through and/or near the expandable tube using a blower, fan or other fluid transfer device situated above-ground. Thus, heating, cooling and/or other thermal conditioning of one or more portions of the tube can be performed convectively. Alternatively, a heater, cooler and/or other temperature-modifying device or method can be used to conductively thermally-condition the expandable tube, as desired or required.

In embodiments where the resin and/or other materials associated with the expandable or carrier tube cure without the use or heating and/or cooling (e.g., cure over time in ambient or generally ambient conditions), one or more fans or other fluid transfer devices can be used to blow ambient air along one or more portions of the tube (e.g., to increase the rate of heat transfer between the air and the tube), thereby facilitating and increasing the rate of curing. Such blowers, fans or other fluid transfer devices can be configured to transfer air along the inside and/or outside of the tube, as desired or required.

According to some embodiments, once the tube 100 has been expanded (e.g., so that the layers positioned along its exterior surface contact and/or adhere to the interior surface of the pipe or other conduit in need of repair), the polyethylene or other main carrier portion of the tube 100 is configured to remain attached to the resin-impregnated layers of fabric 101. Thus, the expandable tube 100 can remain within the pipe as part of using the reinforcement method disclosed herein. Alternatively, the main carrier portion of the tube 100 can be designed to be removed after expansion, thereby leaving only the resin-impregnated fiber layer(s) 101 within the interior of the pipe or other conduit being repaired. In such arrangements, the curing process may target only the epoxy, resin or other thermosetting polymer used to secure the fabric and/or other fiber material 101 (e.g., splayed fiber roving or bundles, etc.) along the outside of the carrier portion of the tube 100.

Figure 2:
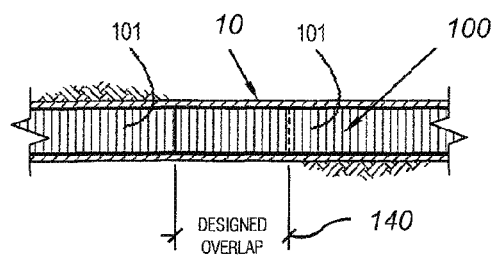
FIG. 2 illustrates a side cross-sectional view of a portion of the tube of FIG. 1 in an expanded orientation.
Figure 3:
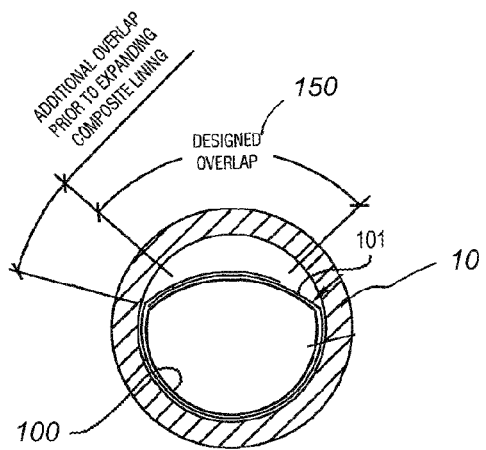
FIGS. 3 and 4 illustrate cross-sectional views of the expandable tube positioned within a pipe in need of repair, with the tube shown in different stages of expansion/contraction.

With reference to the detailed cross-sectional side view of FIG. 2, the adjacent layers of fabric 101 secured to the outside of the expandable tube 100 can include a desired overlap 140 in the longitudinal direction. Likewise, as illustrated in the cross-sectional views of FIGS. 3 and 4, the fiber-laden fabric layers 101 can comprise a certain overlap 150 in the hoop direction, either in lieu of or in addition to the overlap 140 in the longitudinal direction. Accordingly, in some embodiments, such overlaps 140, 150 in the longitudinal and/or hoop directions can help ensure that the desired structural and/or other properties associated with the fabric reinforcement 101 are met. FIG. 3 illustrates the overlap 150 in the hoop direction before the expandable tube 100 is expanded. FIG. 4 illustrates the overlap 150 when the expandable tube 100 is expanded. As shown by comparison between FIGS. 3 and 4, the overlap 150 decreases as the circumference of carrier tube 101 increases and circumference of the overlapped reinforcement material 101 increases.

According to some embodiments, the fibers in the fiber-laden fabric or other fiber-laden materials 101 positioned along the outside of the carrier tube 100 are oriented, at least partially, along or approximately along in weft direction. In other words, the fibers are generally perpendicular (e.g., approximately 90 degrees) relative to the longitudinal axis of the pipe carrier tube 100 and the pipe or conduit in need of repair. Accordingly, in some embodiments, such a configuration advantageously eliminates or reduces the need for hoop laps.

Further, in some embodiments, one or more generally slippery materials can be positioned along portions of the tube 100 where adjacent fiber fabric layers 101 overlap in the longitudinal direction. Accordingly, the use of such slippery materials can help ensure that the longitudinal laps move during use. In one embodiment, a layer of polytetrafluoroethylene may be applied to a longitudinal edge margin of the fabric 101 that is overlapped. This can facilitate sliding movement of the overlapped portions relative to one another as the tube 100 is expanded. It will be understood that other ways of providing a low friction engagement between overlapped portions of the fabric may be used. Moreover, it is also envisioned that no low friction may be used at the overlap within the scope of this invention.

FIG. 5 is a schematic illustration of one embodiment of the carrier tube 100 and a reinforcement material 101. More particularly, the carrier tube 100 is shown immediately outside an opening of a pipe 10. A pull rope 120 is attached to a leading end of the carrier tube 100. The reinforcement material 101 is shown as a fabric supplied on a roll 170. The reinforcement material 101 is wrapped around the tube 101 such that opposite longitudinal edge margins of the reinforcement material form an overlap such as the overlap 150 shown in FIG. 3. In the illustrated embodiment, the carrier tube 101 is pulled across the top of the roll 170 to facilitate removal of the reinforcement material 101 from the roll at about the same rate as the carrier tube 100 is pulled. Other arrangements may be used without departing from the scope of the present invention. As or after the reinforcement material 101 is applied to the carrier tube 100, the carrier tube is pulled into the pipe 10 using the pull rope 120. The carrier tube 100 is expanded inside the pipe 10 to apply the reinforcement material 101 to the inside of the pipe, as described in further detail above. For example, the reinforcement material 101 may be stronger in the weft or hoop direction (indicated by arrow A1) than in the warp or longitudinal direction (indicated by arrow A2). In other words, the reinforcement material 101 may include reinforcing fibers oriented generally perpendicular to the longitudinal axis of the carrier tube 100 for providing strength to the pipe 10 in the hoop direction. Other fibers in the reinforcement material may be oriented generally parallel to the longitudinal axis of the carrier tube 100 for providing flexural strength to the pipe 10. When applied to the carrier tube 100, the fibers are oriented in this direction before expansion of the carrier tube and maintain this orientation as the carrier tube expands. It may be desirable to provide the reinforcement material 101 with stronger fibers in the hoop direction than the longitudinal direction to provide more reinforcement of the pipe in the hoop direction.

FIG. 6 illustrates a segment of a reinforcement material 101 which may be applied on the carrier tube 100 and installed in a pipe 10 according to the present invention. The reinforcement material 101 in this embodiment is a fabric including a stabilized matrix of fiber reinforcement which includes individual bundles 180, 182 of fiber reinforcement stabilized together to form the fabric. The fabric 101 may be formed to have any suitable length and any suitable width (e.g., for overlapping itself on the carrier tube 100 as shown in FIGS. 3-5). The fabric 101 may be formed using loose bundles of fibers 180, 182. For example, the bundles of fibers 180 may extend in the weft or transverse direction A1 of the fabric 101, and the fibers 182 may extend in the warp or longitudinal direction A2 of the fabric. It may be desirable for the transverse fiber bundles 180 to be stronger than the longitudinal bundles 182 to provide greater hoop strength than flexural strength in the pipe 10. In one example, the transverse fiber bundles 180 each include about 50,000 fibers, and the longitudinal fiber bundles 182 each include about 12,000 fibers.

The transverse and longitudinal fiber bundles 180, 182 are stabilized by weaving them between the other of the transverse and longitudinal fiber bundles 180, 182 (i.e., above then below consecutive bundles 180, 182). Hot melt fibers 184 may also be provided to further stabilize the fiber bundles 180, 182. In the illustrated embodiment, hot melt fibers 184 are shown extending in the longitudinal direction. The hot melt fibers 184 extend generally parallel with the longitudinal fiber bundles 182 and are weaved between and secured by the hot melt to the transverse fiber bundles 180. Hot melt fibers may also be provided extending in the transverse direction without departing from the scope of the present invention.

The hot melt fibers 184 may be provided in various densities in the fabric 101. For example, in the illustrated embodiment, the hot melt fibers 184 are provided about every three inches measured along the transverse direction of the fabric 101. The hot melt includes fibers, the diameter of which may be suitably controlled to increase the stability of the fiber bundles 180, 182 in the fabric 101. The stabilization of the bundles 180, 182 by incorporating them in the fabric 101 facilitates handling and application of the fiber bundles and installation of them to the pipe in the desired orientation. More particularly, alignment of the fiber bundles can be maintained as the fabric 101 expands into contact with the inner surface of the pipe. As discussed herein, other forms of fiber reinforcement 101 such as other fabrics and un-stabilized bundles may be used without departing from the scope of the present invention.

The systems, apparatuses, devices and/or other articles disclosed herein may be formed through any suitable means. The various methods and techniques described above provide a number of ways to carry out the inventions. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Although the inventions have been disclosed in the context of certain embodiments and examples, it will be understood by those skilled in the art that the inventions extend beyond the specifically disclosed embodiments to other alternative embodiments and/or uses and obvious modifications and equivalents thereof. Accordingly, it is not intended that the inventions be limited, except as by the appended claims.

What is claimed is:

1. A method of lining an interior of a section of a pipe with a curable liner extending from a first access point to a second access point, the method comprising:
   providing individual bundles of fiber positioned in side-by-side engagement with respect to each other, the individual bundles in side-by-side engagement being stabilized together to form a fiber-laden fabric, the fiber-laden fabric having a length and a width, the individual bundles of fiber stabilized in side-by-side engagement extending along the width of the fiber-laden fabric, the individual bundles of fiber comprising fibers of at least one of carbon, glass, and aramid;
   impregnating the fiber-laden fabric with a curable binder;
   providing a carrier tube having a length for extending from the first access point to the second access point and having a hoop direction transverse to the length, the carrier tube being configured to remain attached to the fiber-laden fabric after curing of the binder;
   positioning the fiber-laden fabric onto the carrier tube by wrapping the fiber-laden fabric around the tube and overlapping longitudinal edge margins of the fiber-laden fabric in the hoop direction of the carrier tube such that the bundles of fiber stabilized in side-by-side engagement extend in the hoop direction of the carrier tube, the overlapped longitudinal edge margins of the fiber-laden fabric extending along the length of the carrier tube, the fiber-laden fabric positioned on the carrier tube having a length for extending from the first access point to the second access point;
   pulling the resin impregnated fiber-laden fabric on the carrier tube into the section of pipe such that it extends from the first access point to the second access point;
   radially expanding the carrier tube from a first diameter to a second diameter, such that the overlap of longitudinal edge margins of the resin impregnated fiber-laden fabric in the hoop direction of the carrier tube decreases and the resin impregnated fiber-laden fabric contacts an interior wall of the section of pipe when the carrier tube is radially expanded to the second diameter;
   while the resin impregnated fiber-laden fabric is in contact with the interior wall of the section of pipe, curing the binder impregnated in the fiber-laden fabric, the carrier tube remaining attached to the cured fiber-laden fabric inside the section of pipe after cure of the binder, thereby providing a cured liner inside the section of pipe extending from the first access point to the second access point.

2. The method of claim 1, wherein the carrier tube is coated with the binder by positioning the fiber-laden fabric on the carrier tube after the fiber-laden fabric is impregnated with the binder.

3. The method of claim 1, further comprising routing the carrier tube through a resin saturator before positioning the fiber-laden fabric on the carrier tube.

4. The method of claim 1, wherein positioning the fiber-laden fabric on the carrier tube comprises pulling the carrier tube across a roll of the fiber-laden fabric and removing the fiber-laden fabric from the roll and wrapping it on the carrier tube at about the same rate as the carrier tube is pulled.

5. The method of claim 1, wherein the fiber-laden fabric includes individual bundles of fiber extending along the length of the fiber-laden fabric.

6. The method of claim 1, wherein the fiber-laden fabric includes carbon fiber and glass fiber.

7. The method of claim 1, wherein the fiber-laden fabric includes at least two layers.

8. The method of claim 7, wherein the fiber-laden fabric includes a layer comprising carbon fibers and a layer comprising glass fibers.

9. The method of claim 1, wherein radially expanding the carrier tube from the first diameter to the second diameter comprises pressurizing an interior of the carrier tube by delivering a volume of air or other fluid therein.

10. The method of claim 1, wherein the binder comprises at least one of a polymeric resin, a thermosetting resin, and a thermoplastic material.

11. The method of claim 1, further comprising curing the carrier tube simultaneously with curing the binder.

12. The method of claim 1, wherein the individual bundles of fiber stabilized in side-by-side engagement extending along the width of the fiber-laden fabric are free of needle punching.

13. The method of claim 1, wherein the fiber-laden fabric is free of needle punching.

14. The method of claim 1, wherein the fiber-laden fabric includes stabilizing fiber interspersed with the individual bundles of fiber in side-by-side engagement.

15. The method of claim 14, wherein the stabilizing fiber extends along the length of the fiber-laden fabric.

16. The method of claim 1, wherein the fiber-laden fabric is impregnated with the curable binder before positioning the fiber-laden fabric on the carrier tube.

\* \* \* \* \*